United States Patent [19]
Thorpe

[11] 3,936,868
[45] Feb. 3, 1976

[54] TELEVISION STUDIO CONTROL APPARATUS

[75] Inventor: Laurence Joseph Thorpe, Marlton, N.J.

[73] Assignee: RCA Corporation, New York, N.Y.

[22] Filed: Mar. 8, 1974

[21] Appl. No.: 449,451

[52] U.S. Cl. .............................. 358/22; 178/DIG. 6
[51] Int. Cl.² .......................................... H04N 5/22
[58] Field of Search .............. 178/DIG. 6, DIG. 23, 178/DIG. 30, 5.8 R; 358/22, 81

[56] References Cited
UNITED STATES PATENTS

| | | | |
|---|---|---|---|
| 2,679,554 | 5/1954 | Hurford | 178/DIG. 6 |
| 3,465,097 | 9/1969 | Brabon et al. | 178/DIG. 6 |
| 3,472,957 | 10/1969 | Kaye et al. | 178/DIG. 6 |

*Primary Examiner*—Richard Murray
*Attorney, Agent, or Firm*—Eugene M. Whitacre; Mason DeCamillis

[57] ABSTRACT

This disclosure describes television studio control apparatus which permits caption or title information to be automatically faded into a video program signal and which further permits that information to be colored, if desired.

5 Claims, 4 Drawing Figures

TELEVISION STUDIO CONTROL APPARATUS

FIELD OF THE INVENTION

This invention relates to television studio control apparatus and, more particularly, to an automatic title fader for keying captions or titles into video program signals.

SUMMARY OF THE INVENTION

As will become clear hereinafter, the automatic title fader of the invention controllably keys auxiliary caption information into a video program signal. The apparatus operates uppon the momentary actuation of a pushbutton, in developing a timing ramp signal which controls the insertion of the caption information into the program video. As will also become clear, a second, momentary pushbutton could be additionally depressed, to apply the video output of a background generator to color the title information inserted. With the advent of integrated circuit techniques, the automatic title fader could be incorporated as a small block in an overall signal switching system, and can be constructed to simply control the time of the ramp generation and the resulting fade time of the caption inlay.

BRIEF DESCRIPTION OF THE DRAWINGS

These and other features of the present invention will be more fully understood from a consideration of the following description taken in connection with the accompanying drawings in which.

DETAILED DESCRIPTION OF THE DRAWINGS

Figure 1:
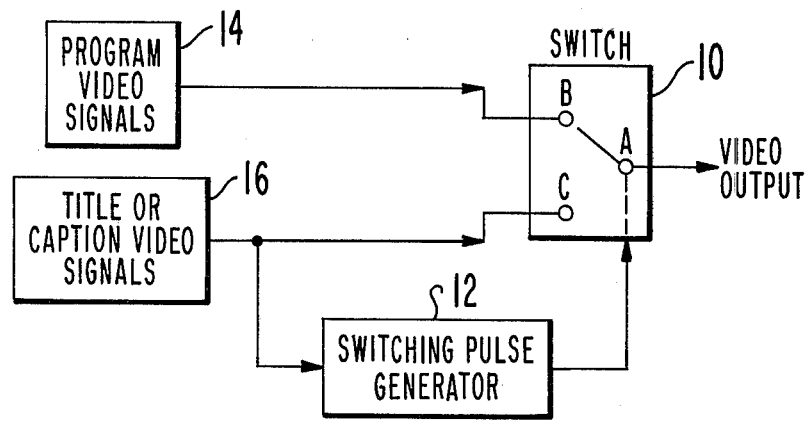
FIG. 1 is a block diagram helpful in an understanding of the invention.

Referring to FIG. 1, there is illustratively shown a video switch 10, electronic in construction, and capable of being rapidly switched to connect its output terminal A to either of its input terminals B or C, under the control of pulses provided by a switching pulse generator 12. Video program signals may be supplied to terminal B from any appropriate source 14, while auxiliary video information, such as titles or captions, may be supplied to terminal C from a second source 16. Such auxiliary signals are also applied to the switching pulse generator 12, in developing control pulses by means of which either input terminal B or terminal C of the video switch 10 is connected to its output terminal A.

As will be readily apparent, as controlled by the switching pulses, the switch 10 can provide a mixture of the two video input informations such that the output signal developed would comprise the program signal with the caption or title signal inserted therein. The output video would then comprise a background signal with a title or caption "keyed" into it. With the switching pulse generator 12 being of design so as to generate, for example, an output pulse on an applied video signal transition, an inlay of the one information into the other would be produced for subsequent transmission to a home receiver for reproduction. Such arrangement is preferable to one where the video signals are mixed together in an adding amplifier in those instances where color representative signals are involved, as the addition could produce a mix of colors which, to some viewers, might be displeasing.

Figure 2:
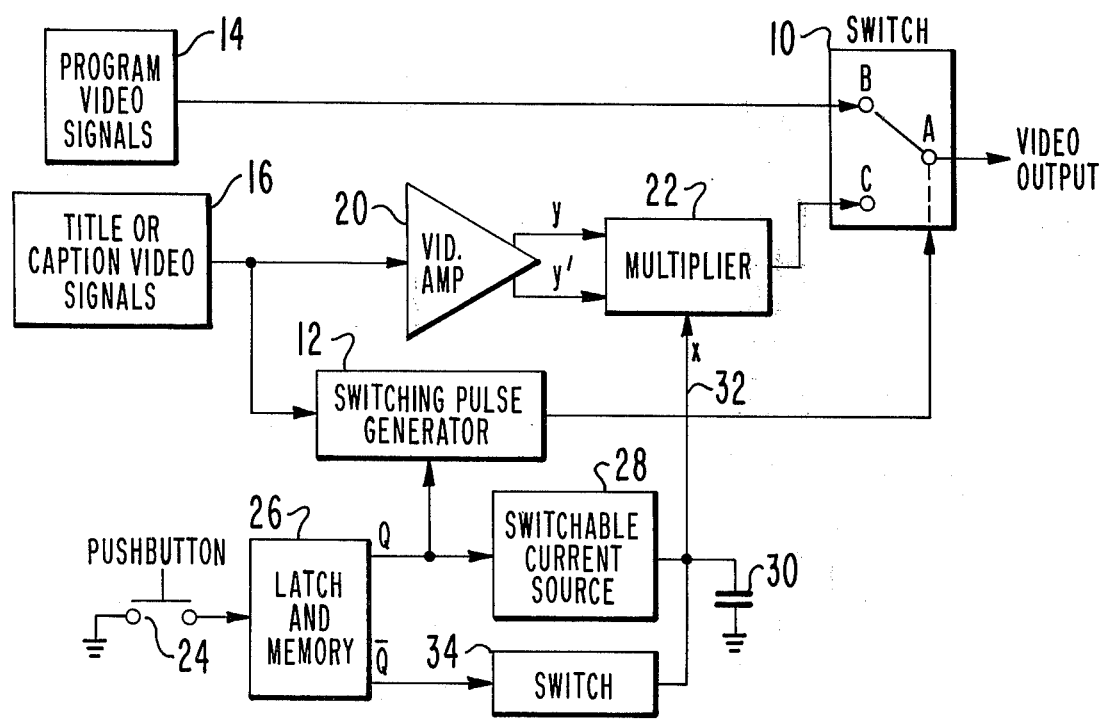
FIG. 2 is a block diagram of television studio control apparatus constructed in accordance with the invention to provide automatic title fading.

Such arrangement can be improved upon in accordance with the present invention, however, by providing a "fade-in" feature, instead of the singular switching function illustrated by this "video key". The embodiment of FIG. 2 shows such a construction, in which the video program signal continues to be supplied from the source 14 while the title or caption video signal continues to be supplied from the source 16. The video switch is again represented by the notation 10, with the designations A and B, C representing its output and input terminals, respectively. As with FIG. 1, the closure of the switch is controlled by the application of keying pulses provided from a generator 12 in response to transitions of the video signal to be inserted.

The configuration of FIG. 2 differs from that of FIG. 1, first of all, in its inclusion of a video amplifier 20 and a multiplier 22 of the type which provides as an output, the product of a $y$ (or $y'$) input signal with an x control signal. When used in the title fader environment of this specification, the $y$ and $y'$ inputs may comprise opposite polarities of the alternating video program signal whereas the $x$ control signal will be of ramp construction. With the output of the multiplier 22 thus being a video signal varying in level as a function of the amplitude of the $x$ ramp control, a linear insertion of the keyed video could be provided where the ramp generation coincides in time with the application of the switching pulses to the switch 10.

The FIG. 2 construction also differs in its inclusion of a momentary pushbutton 24 and a latch and memory, or flip-flop, circuit 26. As indicated, one output terminal Q of the memory 26 couples both to the key pulse generator 12 and to a switchable current source 28, the output of which is connected to the junction between a capacitor 30, referenced to ground, and a linkage 32 providing the $x$ signal input to the multiplier 22. A second switch 34 is finally coupled between that junction point and the second, $\overline{Q}$ terminal of the memory 26. With this arrangement, and with the memory being of complementary logic, a single actuation or depression of the pushbutton 24 will cause, for example, the Q output of the memory 26 to go to a logic 1 condition, with $\overline{Q}$ output then going to a logic 0 state.

When the Q output goes to the 1 state, the current source 28 is switched on, to begin to charge the capacitor 30. At the same instant, the $\overline{Q}$ output, in going to its 0 condition, opens the switch 34, which is electronic in nature, and which had previously been closed to short circuit capacitor 30 to ground. The switchable current charging the capacitor 30 therefore produces a linear voltage ramp along linkage 32, which reaches a predetermined level, controllable, for example, by a limiting action within the current source 28 itself. With the voltage developed across the capacitor being used as the $x$ input signal to the multiplier 22, it will be noted that the video output from the multiplier will thus commence at zero level when the button 24 is initially depressed and will rise linearly to its maximum value where it will remain until the button is pressed again.

Additionally, at the instant the button 24 is actuated, the resultant logic 1 signal developed at the Q output terminal of the memory 26 is also coupled to the key pulse generating circuit 12 to control logic apparatus employed therein in generating the coincidental keying pulses for switch 10 to connect its A and C terminals. Thus, depressing the pushbutton 24 will have the effect of automatically fading in the title or caption video signal as a keyed insert into the program video applied from source 14. The duration of the fade will be seen to be a function of the magnitude of the current source output, and can be remotely controlled by a potentiometer provided on the housing in which the FIG. 2 construction may be incorporated. Subsequent depression of the momentary button 24 will cause the electronic memory 26 to change its state, having the result of inhibiting the generation of the keying pulse by the generator 12, switching the current source 28 to zero, and connecting the switch 34 to discharge capacitor 30 to ground. The effect on the video output produced from the switch 10 will thus be to couple the video program signal without modification from terminal B to terminal A in that the title insert will be switched out.

Figure 3:
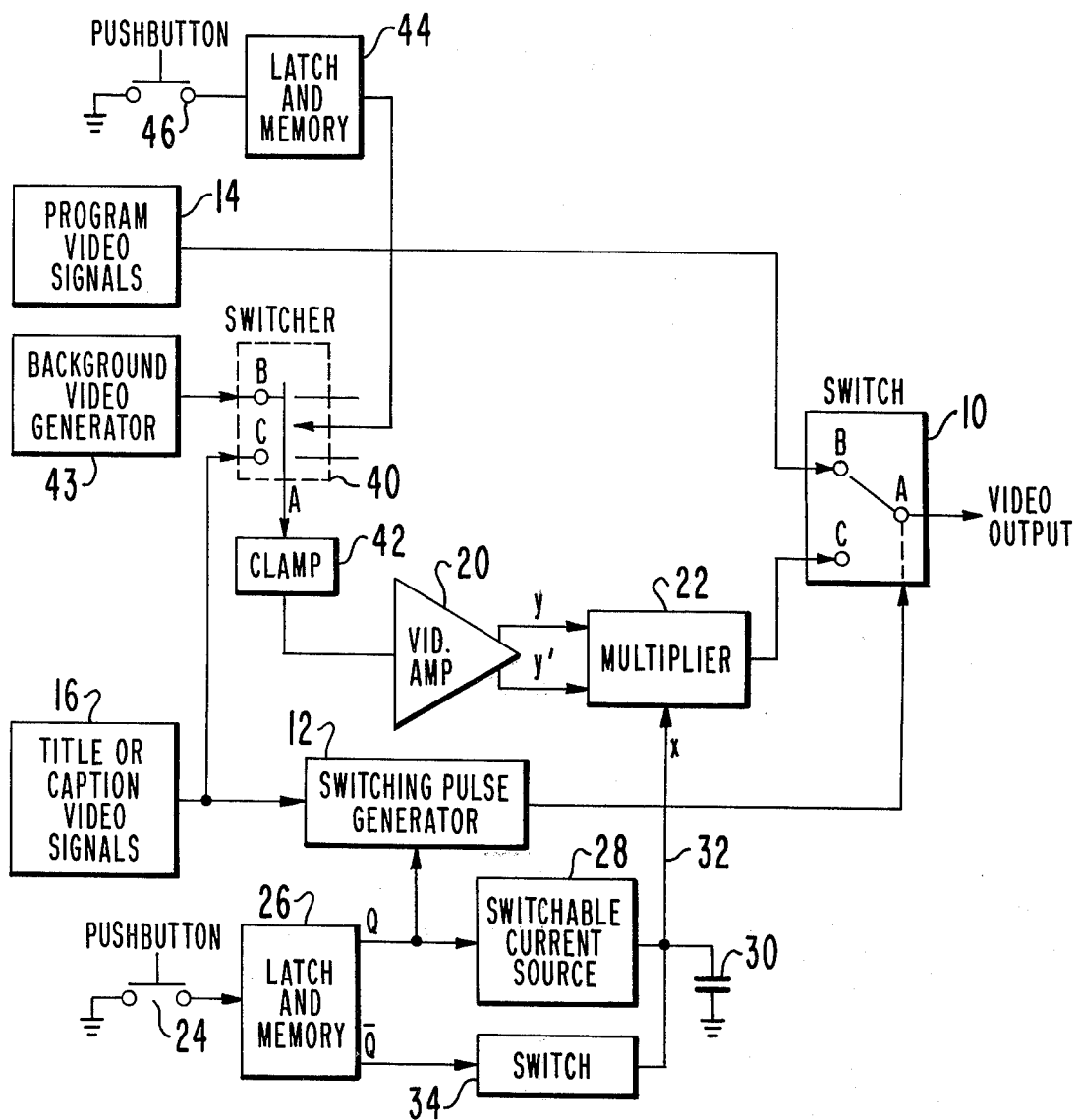
FIG. 3 is a block diagram of a modification of the apparatus of FIG. 2, for inserting title information, either monochrome or color.

The arrangement of FIG. 3 is a modification of that of FIG. 2, in its provision for the "coloring" of the caption title inserted. To this end, the auxiliary title or caption signal source 16 is coupled to the video amplifier 20 by means of a video switch 40 and a clamp 42. In particular, the auxiliary insert is supplied to terminal C of switch 40, to whose terminal B, color information is supplied from a background video generator 44. The output terminal A of the switch 40 either provides the background color video signal or the auxiliary video signal to the clamp 42, under the control of a switching signal provided from a latch and memory, or flip-flop, circuit 44 and a second pushbutton 46. It will be understood that the memory 44 is so arranged with the switch 40 that when a title insert is to be "colored", terminals A and B of the switch 40 will be connected, whereas terminals A and C will be connected when the title signals themselves are to be inserted into the program video signal.

In operation, and assuming it is desired to inlay the monochrome auaxiliary signals into the program video signals, the momentary pushbutton 24 will be actuated while the pushbutton 46 will remain inoperative. With such arrangement terminals A and C of the video switch 40 will be interconnected, the memory 44 being in a disabled condition, and the operation of the title fader is as described with respect to FIG. 2.

On the other hand, when it is desired to color that insert, the pushbutton 46 is actuated. This enables the latch and memory circuit 44 to control the video switcher 40 to interconnect the terminals A and B, thereby coupling the background generated color video signal to the clamp 42. However, even though the title or caption video then becomes disconnected from the video amplifier 20 and multiplier 22, being replaced by the color background, the auxiliary video continues to provide the signal transitions to the generator 12 to develop the timing pulses for the switch 10 in coupling the color information from input terminal B to output terminal A of the switch 10. In other words, instead of the monochrome information being coupled to the video amplifier and multiplier, the color information from the video generator 44 is applied via those units to the switch 10, although under the same timing control to provide the insert information, this time in a color format. Actuating the pushbutton 24, therefore, will insert the caption video in monochrome, whereas actuating the pushbutton 46 will insert the video in color, the appearance of the information content being governed by the widths and timings of the switching pulses from generator 12. As will be apparent, the color information imparted will be under the control of the background video generator, with its hue, luminance and saturation controls.

Figure 4:
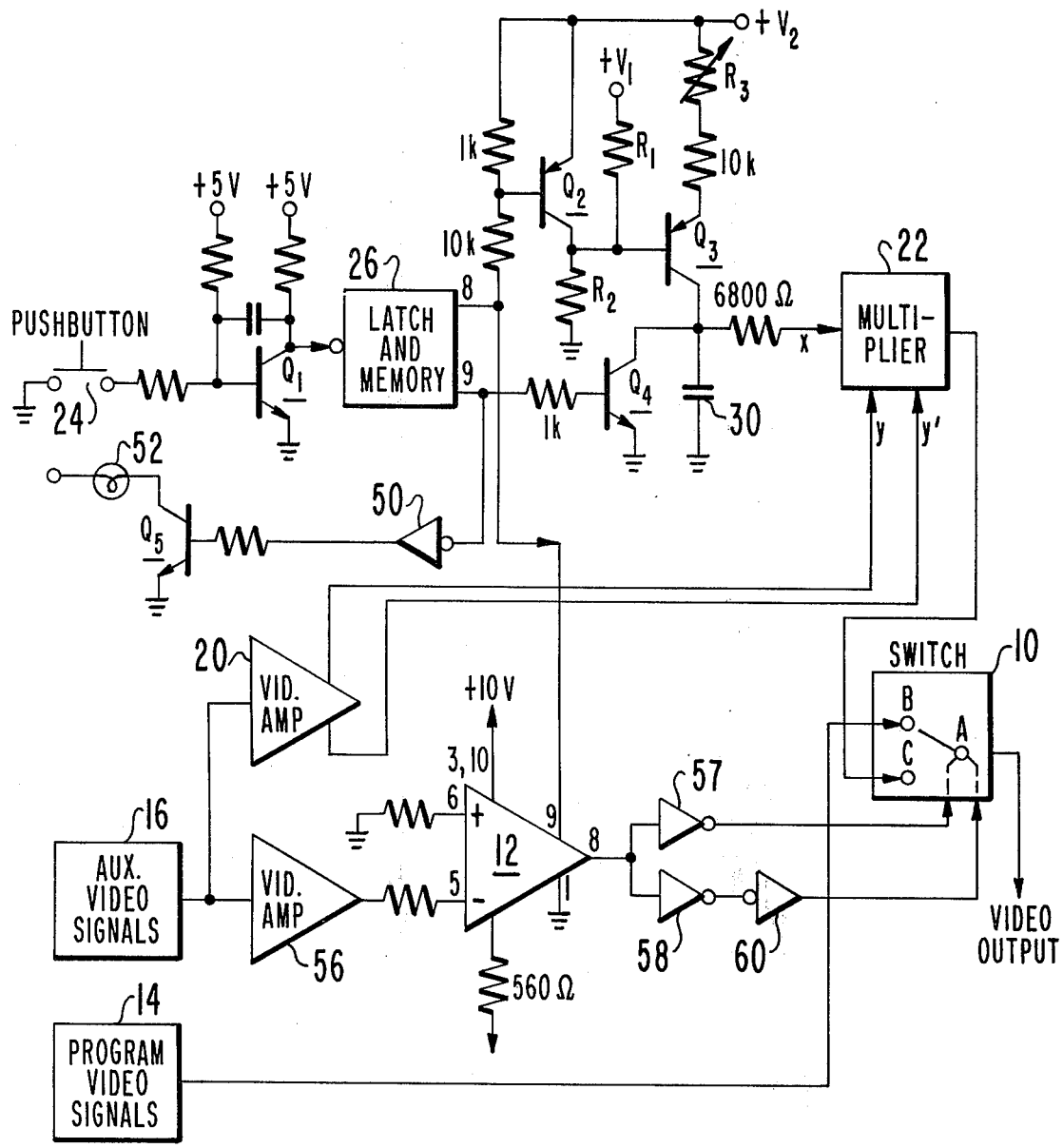
FIG. 4 is a schematic diagram, partly in block form, of a preferred embodiment of the FIG. 2 construction.

The circuit arrangement of FIG. 4 represents one manner of implementing the automatic title fader of FIG. 2. The pushbutton 24, in its quiescent, non-actuated condition, causes the output terminal 9 of the latch and memory 26 to be in a digital 1 state and terminal 8 to be in a digital 0 condition. The inverter 50 utilizes the digital 1 potential at terminal 9 to turn transister $Q_5$ "off" so that no current is drawn through an illuminating lamp 52 which indicates whether auxiliary title information is being inserted.

With terminal 8 in its digital 0 state, the transistor $Q_2$ is conducting, the transistor $Q_3$ is nonconducting, and there is no current flow to the capacitor 30 connected to the collector electrode of transister $Q_3$ Furthermore, because output terminal 9 of the memory 26 is in a digital 1 state, the switch transistor $Q_4$ is fully saturated, so that the capacitor 30 is short circuited to ground and fully discharged. As there is then no potential difference across capacitor 30, no output signal is applied to the multiplier 22.

The auxiliary video signal from the source 16 is applied to a video amplifier 56, the output of which is coupled to an input terminal 5 of a pulse generator 12 which provides an output whenever the signal voltage crosses the potential applied to a seond input terminal 6. In accordance with the invention, however, a control terminal 9 in the generator 12 is used by the memory 26 to enable or disable the operation of the generator. As illustrated in the drawing, and under the quiescent condition, the digital "0" state existent at terminal 8 of the memory 26 serves to disable the pulse generation for activating the video switch 10. Under this condition, therefore, only the program video applied to terminal B of the switch 10 will be coupled as an output—in other words, without title or caption video inserted.

Upon the momentary actuation of the pushbutton 24, the instantaneous closure to ground which occurs is transferred by the transistor $Q_1$ to trigger the memory 26. The resultant change at output terminal 8 to the digital 1 condition switches transistor $Q_2$ off, thereby instantaneously clamping the base electrode of transistor $Q_3$ to a potential determined by the resistors $R_1$, $R_2$ and the $+V_1$ power supply. A constant current, determined by this value of base potential and the emitter resistance of transistor $Q_3$, then flows to charge capacitor 30 from the potential source $+V_2$. At the same time, the change to the 0 state at terminal 9 of the memory 26 turns transistor $Q_4$ off, removing the short circuit from capacitor 30 so as to permit it to charge linearly. The ramp waveform of voltage developed across capacitor 30 levels off to a constant voltage when the collector electrode potential of transistor $Q_3$ approaches the base potential at saturation. As shown, this voltage across capacitor 30 is applied to the multiplier 22 as the $x$ signal input. Also, at the same time, inverter 50 senses the change in state at memory terminal 9 to turn transistor $Q_5$ on and provide a current flow through the illuminating lamp 52. The light indicates that title video is then being inserted into the program video signal.

When the memory 26 changes its state in response to the pushbutton actuation, the inhibiting potential applied by it to terminal 9 of the generator 12 is also removed. Logic switching pulses will thereafter be produced at terminal 8 of the generator as a function of the video signal transitions on input terminal 5, the input terminal 6 essentially being grounded. With an arrangement as shown in FIG. 2, the pulses developed would be directly applied to control the input/output connections of the video switch 10. In an embodiment of the invention (as illustrated in FIG. 4), complementary polarity switching pulses are developed for use where the video switch is of the type providing two transistor alternate switching for improved isolation at high video frequencies. Inverters used to provide these opposite polarity pulses from the generator 12 are shown as 57, 58 and 60 of FIG. 4. The auxiliary title information supplied from the source 16 is also coupled to a video amplifier 62 having a differential output to provide the opposite polarity $y$ and $y'$ input signals for the multiplier 22.

With this arrangement, the auxiliary title or caption video will be seen to fade into the program video with a time constant essentially controlled by the setting of the potentiometer $R_3$ in the emitter leg of transistor $Q_3$. Until the pushbutton 24 is actuated once more, this described condition persists, and the lamp 52 remains illuminating.

While applicant does not wish to be limited to any particular set of values, the following have proved useful in an embodiment of the invention constructed in accordance with the FIG. 4 construction:

| | |
|---|---|
| Pulse Generator 12 | Motorola Type MC 1514 |
| Multiplier 22 | Motorola Type MC 1595L |
| Memory 26 | Motorola Type MC 853 |
| Inverters 50, 57, 58, 60 | Motorola Type MC 846 |
| Resistor $R_1$ | 3,300 ohms |
| Resistor $R_2$ | 4,300 ohms |
| Potentiometer $R_3$ | 500 kilohms |
| Capacitor 30 | 10 microfarads |
| Transistor $Q_1$ | 2N3904 |
| Transistor $Q_2$ | 2N3906 |
| Transistor $Q_3$ | 2N3906 |
| Transistor $Q_4$ | 2N3904 |
| Potential Source $V_1$ | +5 volts |
| Potential Source $V_2$ | +10 volts |

While there have been described what are considered to be preferred embodiments of the present invention, it will be readily appreciated that modifications may be made by those skilled in the art without departing from the scope of the teachings herein.

What is claimed is:

1. Television studio control apparatus, comprising: a mixer having a pair of input terminals, a control terminal and an output terminal; means applying first video signals to one of said pair of input terminals; means applying second video signals to the other of said pair of input terminals; means applying switching signals to said control terminal substantially in time synchronism with the application of said second video signals to said mixer for coupling said second video signals to said output terminal in the presence of said switching signal and for coupling said first video signals to said output terminal in the absence of said switching signals; said second video signal applying means applying its signals to said other of said pair of input terminals at an amplitude level which varies linearly with time.

2. Television studio control apparatus according to claim 1 wherein said second video signal applying means applies its signals to said other of said pair of input terminals at an amplitude level which increases linearly with time to a predetermined level.

3. Television studio control apparatus according to claim 1 wherein there is also included actuating means responsive to control said second video signal means to apply video signals to said other of said pair of input terminals and to control said switching signal means to apply switching signals to said control terminal.

4. Television studio control apparatus according to claim 3 wherein said second video signal applying means includes a signal switcher having a pair of input terminals, a control terminal and an output terminal, a source of monochrome video signals coupled to one of said pair of switcher input terminals, a source of color video signals coupled to the other of said pair of switcher input terminals, second actuating means coupled to said control terminal of said switcher and responsive to couple one of said video signal sources to said output terminal of said swticher, and means coupling said output terminal of said switcher to the other of said pair of mixer input terminals.

5. Television studio control apparatus according to claim 3 wherein said second video signal applying means includes a signal multiplier having an input terminal, a control terminal and an output terminal, a source of video signals coupled to said input terminal of said multiplier and a source of control voltage linearly varying with time coupled to said control terminal of said multiplier, said multiplier providing said second video signal of linearly increasing amplitude at the output terminal thereof for application to said other of said pair of mixer input terminals.

* * * * *